July 13, 1965   V. ADAM   3,194,042
DEVICE FOR SHAPING AND HARDENING PLANE SURFACES
Filed Sept. 6, 1963

INVENTOR.
Václav Adam
BY

3,194,042
DEVICE FOR SHAPING AND HARDENING PLANE SURFACES

Václav Adam, Semily, Czechoslovakia, assignor to Výzkumný a Zkušební Letecký ústav, Letňany u Prahy, Czechoslovakia
Filed Sept. 6, 1963, Ser. No. 307,230
Claims priority, application Czechoslovakia, Oct. 13, 1962, 5,813/62
3 Claims. (Cl. 72—76)

The present invention relates to a device for shaping and hardening plane surfaces, such as sliding surfaces, where high smoothness and resistance to abrasion is required, by rotary forging by means of forging bodies.

Plane surfaces of different machine parts are at present mostly obtained by cutting methods as, for instance, planing, milling, grinding and lapping.

All these methods transform a large part of the material to chips, and in addition milling and planing leaves grooves on the surface, while grinding produces a thin depreciated layer.

At the same time, there are shaping methods known which only regroup material to the required shape without removing material, accompanied by simultaneous substantial hardening.

Other known shaping methods use balls which are either rolled across the surface to be planed or are thrown against the surface. These shaping methods have some drawbacks, however, in that the elementary shapes of the ball surfaces are pressed into the shaped surface and an inadmissible impressing takes place with a final peeling of the surface and resulting unevenness.

Endeavors to shape plane surfaces by a rotational movement, for instance, of rollers or cones met with difficulties when the tool was advanced in the course of such shaping.

All disadvantages of the known methods are eliminated by the arrangement according to this invention. It enables considerable advances of the tool across the treated surface while achieving unprecedented evenness and making it possible to use common machines as milling, boring and similar machines, whereby their spindles are not overstressed by these extensive operations.

Figure 1:
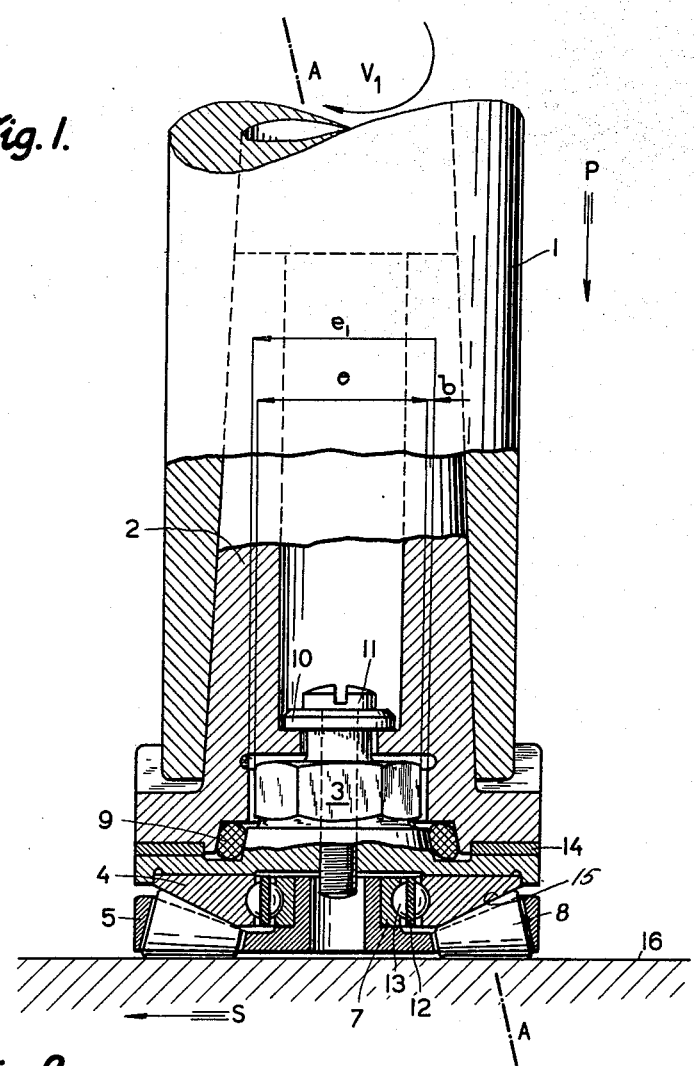
Figure 2:
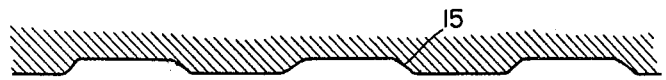

An embodiment of an arrangement according to this invention is shown in the accompanying drawing wherein FIG. 1 is a partial cross section thereof and FIG. 2 shows alternately receding and protruding surfaces of an axial cam when developed in a cross section taken in the plane of the line A—A of FIG. 1.

My device for shaping and hardening of plane surfaces by rotary forging comprises a body 2 fixed on a driving spindle 1, for instance, of a milling machine. On the front of the body 2 there is, centrally thereof, a carrier 3. An annular insert 14 is interposed between the body 2 and the carrier 3. The carrier 3 is seated in a cavity of the body 2 and held therein by a washer 10 and a screw bolt 11. It has a radial play $b$ and is radially supported by a compensating damper 9, and is also free to move somewhat axially. The damper 9 returns the carrier 3 whenever it deviates from its central position.

A conical cam 4 is pressed into a seat of the carrier, the conical surface 15 of said cam being provided with alternately receding and protruding surfaces. The inner wall of the cam 4 forms an outer space of a ball bearing with balls 13 and a cage 12. A bearing ring 7 constitutes the inner race and forms a cage 5 which rotatably supports working bodies 8. The latter are radially movable with respect to their axes.

In order to relieve the spindle stock from shocks, it is advisable to provide a fly wheel on the spindle 1.

It is possible to provide the device with a plurality of cams 4, cages 5, and sets of bodies 8. The units are preferably concentrically arranged.

The conicity of the surface 15 of the cam 4 depends upon the conicity of the working bodies 8 so that the latter have a geometrically plane working surface.

The shaping and hardening of plane surfaces by rotary forging is accomplished by moving the device according to this invention onto the surface of a material 16, which is to be treated. The driving spindle 1 causes the bodies 8 to perform a rolling movement along the cam 4. Its undulated surface 15 alternately presses the bodies 8 to the required and adjusted depth into the surface of the product 16. While alternately working with shocks and rolling actions, the bodies 8 forge and shape the product 16.

While the body 2 driven by the driving spindle 1 performs the main rotational movement $v_1$, a shifting $s$ of the device along the surface of the product 16 is offset by the damper 9 at the moment the bodies 8 come between a projecting surface of the cam 8 and the product 16. When the bodies 8 engage a receding surface of the cam 4, the damped advance results in a resilient return of the compensating damper 9 to its original position whereby the carrier 3 with the cam 4, cage 5, and bodies 8 also return to their original position.

This cycle repeats with a frequency which is the product of the number revolutions and of the square of the number of bodies.

Thus, unprecedented hardening and geometrically plane conditions of the worked product 16 are achieved, allowing a considerable advance of the tool.

The arrangement according to this invention can also be used for applying malleable layers upon surfaces of different bodies and for permanent saturation of a roughened surface, for instance, with slippery or non-corroding material.

I claim:

1. A device for shaping and hardening of plane surfaces by rotary forging on a machine provided with a driving spindle, said device comprising a body adapted to be connected to the driving spindle of the machine, a carrier supported by said body for rotational movement therewith and for a limited radial and axial movement relatively to the body, compensating damper means interposed between the body and the carrier, said compensating damper means retaining the carrier in co-axial relationship to the body, a conical cam rigidly secured to the carrier, alternatingly receding and protruding surfaces on the conical part of said conical cam, a set of balls arranged for rolling movement along the inner wall of said conical cam, an inner bearing ring engaging the set of balls at its outer periphery, a cage rigidly secured to the inner bearing ring for rotation therewith, and a set of working bodies, mounted for rotation in said cage and for a limited radial movement with respect to their axis, said working bodies being in rolling engagement with the receding and protruding surfaces on the conical cam.

2. A device for shaping and hardening of plane surfaces by rotary forging on a machine provided with a driving spindle, said device comprising a body adapted to be connected at one end to the spindle of the machine for rotation therewith, a carrier supported by said body at its other end for rotational movement therewith and for a limited radial and axial movement relative to the body, a part of said carrier having an edged outer formation, a recess in said body, said recess having an edged formation complementary to that of the edged part of the carrier and enclosing said part of the carrier with a radial play, axial retaining means retaining said carrier in position and allowing a limited axial movement thereof, compensating damper means interposed between the body and the carrier, said compensating damper means retaining the carrier in co-axial relationship to the body, a conical cam of annular formation rigidly secured to the carrier, alternatingly receding and protruding surfaces on the conical part of said conical cam, an outer runway in the inner surface of the annular conical cam, a set of balls arranged for rolling motion along said outer runway, an inner bearing ring, an inner runway in said inner bearing ring, the inner runway in the inner bearing ring contacting the set of balls, the conical cam, the set of balls and the inner bearing ring constituting a roller bearing, a cage rigidly secured to the inner bearing ring for rotation therewith and a set of tapered working bodies mounted for rotation in said cage and for limited radial movement relative to their axis, said working bodies being in rolling engagement with the conical wall of said conical cam.

3. A device for shaping and hardening of plane surfaces by rotary forging on a machine provided with a driving spindle, said device comprising a body adapted to be connected at one end to the spindle of the machine for rotation therewith, an insert fixed to the other end of the body, a carrier mounted on said insert and supported by said body for rotational movement therewith and for a limited radial and axial movement relative to the body, a part of the carrier having an edged outer formation, a recess in said body, said recess having an edged formation complementary to that of the edged part of the carrier and enclosing said edged part of the carrier with a radial play, axial retaining means retaining the carrier in position and allowing a limited axial movement thereof, resilient compensating damper means interposed between the body and the carrier, said damping means retaining the carrier in a co-axial relationship to the body, a seat in the carrier, a conical cam of annular formation rigidly mounted in said seat, alternatingly receding and protruding sections on the conical part of the cam forming an undulated surface on the conical wall of the cam, a runway in the inner surface of the conical cam, a set of balls arranged for rolling motion along said runway, a first cage enclosing the balls in the manner of a cage of a ball bearing, an inner bearing ring mounted coaxially with the conical cam, an inner runway in the inner bearing ring contacting the set of balls, a second cage rigidly secured to the inner bearing ring for rotation therewith and a set of working bodies mounted for rotation in said second cage and for limited radial movement relative to their axis, said working bodies being in rolling engagement with the undulated conical wall of the conical cam, the angle of inclination of the conical cam wall and the taper of the conical working bodies being such that the generatrix of the working body, when in its outermost position, lies in a plane perpendicular to the axis of the spindle.

References Cited by the Examiner
UNITED STATES PATENTS

| 1,501,690 | 7/24 | Strong | 29—90 |
| 1,702,750 | 2/29 | Stumpf | 80—1 |
| 2,390,651 | 12/45 | Iseman | 29—90 |

FOREIGN PATENTS 1,093,249  11/60  Germany.

CHARLES W. LANHAM, *Primary Examiner.*